United States Patent
Daire

[19]

[11] Patent Number: 5,863,995
[45] Date of Patent: Jan. 26, 1999

[54] ETHYLENE POLYMERISATION PROCESS

[75] Inventor: Erick Daire, Chateauneuf-les-Martigues, France

[73] Assignee: BP Chemicals Limited, United Kingdom

[21] Appl. No.: 967,081

[22] Filed: Nov. 10, 1997

Related U.S. Application Data

[63] Continuation of Ser. No. 378,084, Jan. 25, 1995, abandoned, which is a continuation of Ser. No. 225,515, Apr. 11, 1994, abandoned, which is a continuation of Ser. No. 935,042, Aug. 25, 1992, abandoned.

[30] Foreign Application Priority Data

Aug. 30, 1991 [FR] France .................................. 91 11021

[51] Int. Cl.$^6$ .................................. C08F 4/44; C08F 4/64
[52] U.S. Cl. .................. 526/144; 526/124.3; 526/125.2; 526/129; 526/158; 502/128
[58] Field of Search .............................. 526/124.3, 125.2, 526/129, 144, 158

[56] References Cited

U.S. PATENT DOCUMENTS

| | | | |
|---|---|---|---|
| 3,432,513 | 3/1969 | Miller et al. | 526/144 |
| 4,314,046 | 2/1982 | Ueno et al. | 526/125.2 |
| 4,348,507 | 9/1982 | Ueno et al. | 526/125.2 |
| 4,400,302 | 8/1983 | Goodall et al. | 526/125.2 |
| 4,414,132 | 11/1983 | Goodall et al. | 526/125.2 |
| 4,471,066 | 9/1984 | Sakurai et al. | 502/113 |
| 4,544,648 | 10/1985 | Nomura et al. | 526/125.2 |
| 4,568,658 | 2/1986 | Cook | 502/107 |
| 4,657,995 | 4/1987 | Job | 526/125.2 |
| 4,657,998 | 4/1987 | Malpass | 526/144 |
| 4,665,141 | 5/1987 | Aylward | 526/144 |
| 4,849,483 | 7/1989 | Tachikawa et al. | 526/125.2 |
| 4,866,021 | 9/1989 | Miro et al. | 502/113 |
| 5,124,296 | 6/1992 | Chamla et al. | 502/113 |
| 5,693,583 | 12/1997 | Hagerty et al. | 526/129 |

FOREIGN PATENT DOCUMENTS

| | | | |
|---|---|---|---|
| 0 004 790 | 10/1979 | European Pat. Off. | 526/125.2 |
| 32308 | 12/1980 | European Pat. Off. . | |
| 0 115 691 | 8/1984 | European Pat. Off. | 526/125.2 |
| 0 127 487 | 12/1984 | European Pat. Off. | 526/125.2 |
| 1133383 | 2/1985 | European Pat. Off. . | |
| 0134100 | 3/1985 | European Pat. Off. . | |
| 0196830 | 3/1985 | European Pat. Off. . | |
| 0197685 | 3/1985 | European Pat. Off. . | |
| 0197689 | 3/1985 | European Pat. Off. . | |
| 0197690 | 3/1985 | European Pat. Off. . | |
| 59-12904 | 1/1984 | Japan | 526/125.2 |
| 60-139707 | 7/1985 | Japan | 526/125.2 |
| 60-161404 | 8/1985 | Japan | 526/125.2 |
| 61-233005 | 10/1986 | Japan | 526/125.2 |
| 3-24103 | 2/1991 | Japan | 526/125.2 |
| 2 040 967 | 9/1980 | United Kingdom | 526/125.2 |
| 91 13914 | 9/1991 | WIPO . | |

*Primary Examiner*—Mark L. Bell
*Assistant Examiner*—J. Pasterczyk
*Attorney, Agent, or Firm*—Brooks Haidt Haffner & Delahunty

[57] ABSTRACT

The present invention relates to an ethylene polymerization process carried out with the aid of a catalyst system of the Ziegler-Natta type consisting essentially of titanium, halogen and magnesium. The process is performed such that the ethylene polymerization takes place in the presence of a polychlorinated saturated hydrocarbon compound. The halogenated hydrocarbon compound is used in a quantity such that the molar ratio of the halogenated hydrocarbon compound to titanium of the catalyst is in the range from 0.01 to 1.8. Preferably the halogenated hydrocarbon compound is chloroform or trichloro-1,1-ethane.

11 Claims, 1 Drawing Sheet

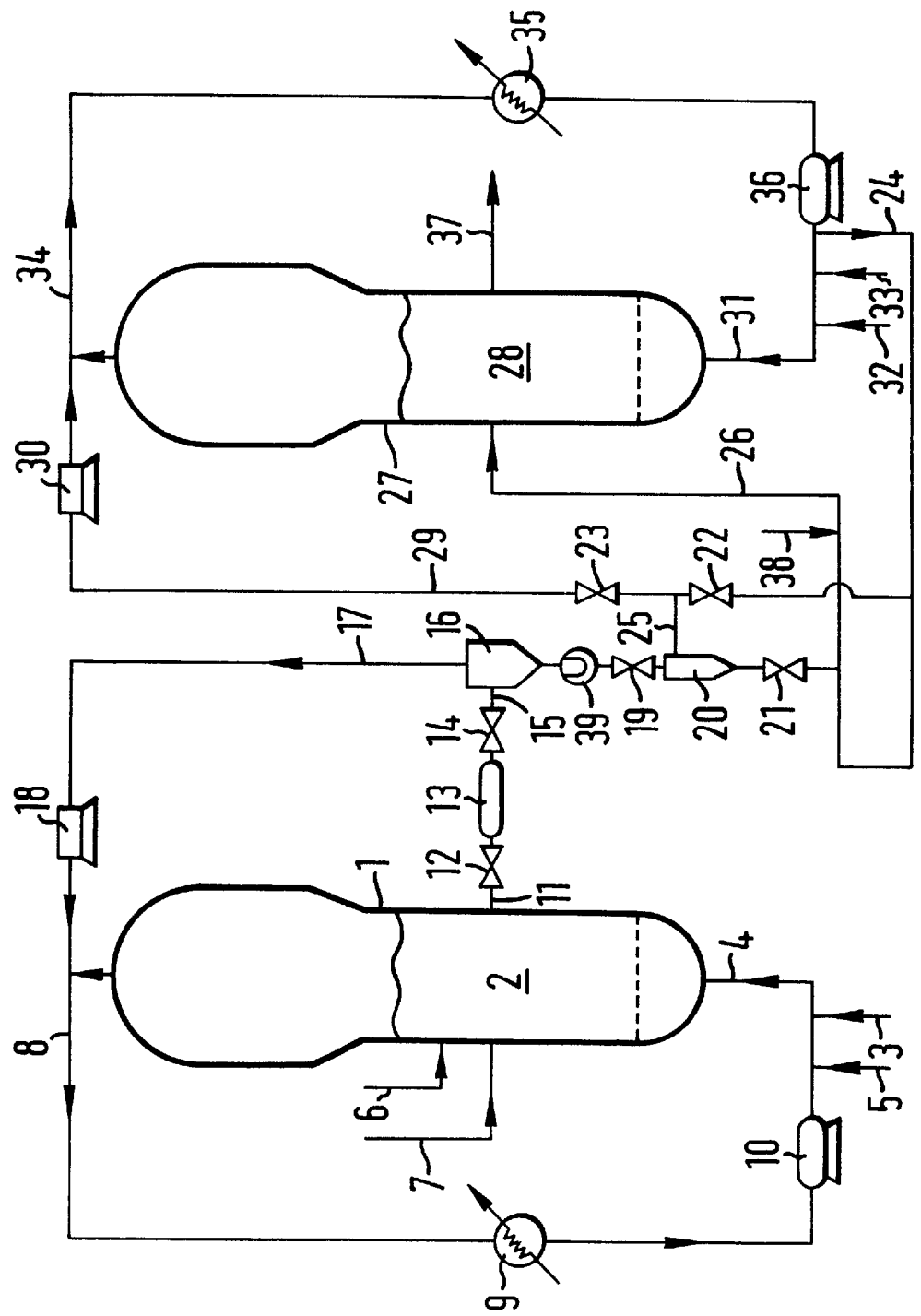

ETHYLENE POLYMERISATION PROCESS

This application is a continuation of Ser. No. 08/378084, filed Jan. 25, 1995, abandoned, which is a continuation of Ser. No. 08/225515, filed Apr. 11, 1994, abandoned, which is a continuation of Ser. No. 07/935042, filed Aug. 25, 1992, abandoned.

BACKGROUND OF THE INVENTION

The present invention relates to an ethylene polymerization process using a Ziegler-Natta type catalyst system.

According to EP-B-192 427 it is known to produce ethylene polymers by a gas phase polymerization process carried out in two consecutive polymerization reactors. According to this process, the catalyst used can be chosen from a wide variety of catalysts. However when this process is performed using a titanium based catalyst, ethane formation was very often observed in particular in the first reactor where hydrogen content is relatively high for producing polymers having a high melt index.

According to EP-A-197 689 it is known to polymerize olefins with a vanadium based catalyst used in the presence of chloroform as a catalyst promoter.

A process has now been found for the production of ethylene polymers carried out with a Ziegler-Natta type catalyst which makes it possible to substantially reduce the formation of ethane, in particular when a polymer having a high melt index is produced from a reaction mixture having a relatively high hydrogen content.

SUMMARY OF THE INVENTION

The present invention provides an ethylene polymerization process carried out with the aid of a catalyst system of the Ziegler-Natta type comprising a titanium based catalyst characterized in that the ethylene polymerization takes place in the present of a halogenated hydrocarbon compound.

According to the invention the ethylene polymerization is carried out in the present of a halogenated hydrocarbon compound. In fact, it has been found, surprisingly, that a halogenated hydrocarbon compound enables the formation of ethane to be substantially reduced. This result is of particular interest if the polymerization reaction is carried out with limited losses in a gaseous reaction mixture because of significant recycling of gaseous reaction mixture into the polymerization reactor. In this case, owing to the presence of the halogenated compound the polymerization reaction can be carried out using a gaseous reaction mixture having a low ethane content, while keeping the losses of gaseous reaction mixture to a low value.

The use of the halogenated compound is of particular interest when the reaction mixture contains hydrogen. More particularly the process of the invention is useful when the reaction mixture contains hydrogen in a quantity such that the molar ratio of hydrogen to ethylene is higher than 0.5. However the halogenated hydrocarbon compound can be usefully employed even in the absence of hydrogen.

The halogenated hydrocarbon compound can be a monohalogenated or a polyhalogenated hydrocarbon compound. Halogen atom(s) of the compound can be chlorine, bromine or iodine. Preferably the halogenated compound is chloroform or trichloro-1,1,1-ethane.

The halogenated hydrocarbon is generally used in a quantity such that the molar ratio of halogenated compound to the titanium in the catalyst is in the range from 0.01 to 1.8, and preferably in the range from 0.05 to 0.5. Typically this ratio is around 0.1. Surprisingly within these ranges no substantial variation of the average activity of the catalyst is observed.

The titanium based catalyst can be a catalyst comprising essentially atoms of titanium, halogen and magnesium. The catalyst can be employed directly or previously supported on a granular inorganic support selected for example from refractory products, for example alumina, silica, aluminium silicate or magnesium silicate.

The titanium based catalyst is preferably a solid catalyst of particulate type comprising magnesium, chlorine, titanium atoms as well as a granular support based on refractory oxide. This catalyst is prepared by a process comprising a) in a first step, bringing a granular support based on refractory oxide, having hydroxyl groups, into contact with an organometallic compound comprising a dialkylmagnesium or the dialkylmagnesium and a trialkylaluminium, b) in a second step, bringing the product resulting from the first step into contact with a monochlorinated organic compound of general formula $R_6R_7R_8CCl$ or of the general formula $R_9R_{10}R_{11}CCl$, in which $R_6$ and $R_7$ are identical or different alkyl radicals comprising from 1 to 6 carbon atoms, $R_8$ is a hydrogen atom or an alkyl radical comprising from 1 to 6 carbon atoms which is identical to or different from $R_6$ and $R_7$, and $R_9$ is an aryl radical comprising from 6 to 10 carbon atoms and $R_{10}$ and $R_{11}$ are identical or different radicals chosen from hydrogen, alkyl radicals comprising from 1 to 6 carbon atoms and aryl radicals having from 6 to 10 carbon atoms, which are identical to or different from $R_9$, and c) in a third step, bringing the product resulting from the second step into contact with at least one tetravalent titanium compound.

The granular support based on refractory oxide has hydroxyl groups and advantageously has a specific surface area (BET) of between 50 and 1000 $m^2$/g and a pore volume of between 0.5 and 5 ml/g.

The quantity of hydroxyl groups in the support depends on the support used, on its specific surface area and on the physicochemical treatment and the drying to which it has been subjected. Generally, a support ready for use contains from 0.1 to 5, preferably from 0.5 to 3, millimoles of hydroxyl groups per gram. The granular support is preferably free from free water at the time of its use in the preparation of the catalyst. The free water can be removed from the granular support by known means, such as a heat treatment performed in the range from 100° C. to 950° C. The support can be chosen, for example, from a silica, an alumina, a silica/alumina or a mixture of these oxides and be composed of particles having a weight average diameter in the range from 20 to 250 microns, preferably between 30 and 300 microns. A silica is preferably used.

The first step of the preparation of the solid catalyst consists in bringing the granular support into contact with an organometallic compound comprising a dialkylmagnesium of general formula

or the dialkylmagnesium and a trialkylaluminium of general formula

in which $R_1$, $R_2$, $R_3$, $R_4$ and $R_5$ are identical or different alkyl radicals comprising from 1 to 12 carbon atoms, preferably from 2 to 8 carbon atoms. The molar ratio of the amount of trialkylaluminium to the amount of dialkylmagnesium preferably should not exceed 1.

Dibutylmagnesium, dihexylmagnesium, butylethylmagnesium, ethylhexylmagnesium or butyloctylmagnesium are the preferred dialkylmagnesium.

When the dialkylmagnesium is used with a trialkylaluminium, it is possible to prepare beforehand an addition compound of general formula

$MgR_1R_2 \times AlR_3R_4R_5$ in which $R_1$, $R_2$, $R_3$, $R_4$ and $R_5$ are defined as above and x is a number equal to or less than 1. The addition compound can be prepared by known methods, such as heating at a temperature in the range, preferably, from 30° to 100° C., of a mixture of dialkylmagnesium and trialkylaluminium in solution in a liquid hydrocarbon medium. An addition compound between dibutylmagnesium and triethylaluminium, or dihexylmagnesium and triethylaluminium, or butyloctylmagnesium and triethylaluminium is preferably used.

The dialkylmagnesium, the trialkylaluminium or the addition compound are, preferably, used in the form of a solution in a liquid hydrocarbon, such as n-hexane or n-heptane.

The first step, like, moreover, the other steps of the preparation of the solid catalyst, is carried out in a liquid hydrocarbon medium consisting of at least one saturated hydrocarbon, such as n-butane, n-pentane, isopentane, n-hexane or n-heptane, this hydrocarbon being inert with respect to the various compounds involved in the preparation of the solid catalyst.

During the first step, the organometallic compound becomes fixed on the granular support. It is believed that this fixation results from a reaction between the hydroxyl groups of the granular support and the organometallic compounds, and/or from a physicochemical adsorption, probably due in part to a complexation of the organometallic compounds by certain oxygen atoms of the refractory oxide. This organometallic compound can be fixed to the support in complex form, in particular in dimer or trimer form. Generally, the value of a support can be estimated by its total capacity for fixing the organometallic compound. Its maximum fixing capacity obviously depends on the nature of the support, on its specific surface and on the physicochemical treatment and the drying to which the support can have been subjected beforehand. Generally, the maximum fixing capacity of a support can be from 1 to 5 millimoles of organometallic compound per gram of support. This maximum capacity can be easily determined by a man skilled in the art, by means of previous trials.

The molar amount of organometallic compound (i. e. dialkylmagnesium and trialkylaluminium) to be used can be in deficiency, or identical, or in excess relative to the number of moles of hydroxyl groups present in the support. However, in order to avoid using an excessive amount of organometallic compound, the amount of this compound effectively used is generally only slightly higher than the maximum amount capable of being fixed to the granular support. During the first step of the process any molar amount of the organometallic compound can be used. However, it is recommended to use a total amount of organometallic compound, of 0.1 to 7.5 millimoles, preferably of 0.5 to 4.5 millimoles and more particularly of 1 to 3.5 millimoles per gram of the support.

The first step can be carried out in various ways. It is possible, for example, to add the organometallic compound to the granular support, previously suspended in the liquid hydrocarbon medium. This addition can be carried out for example over a period of between 10 and 300 minutes, with stirring and at a temperature of between 0° C. and 80° C. If a dialkylmagnesium and a trialkylaluminium are used, these are brought into contact with the granular support either at the same time or by successive additions of the two compounds in arbitrary sequence or by addition of the mixture previously formed by these two compounds, to the liquid hydrocarbon medium containing the granular support.

If the organometallic compound has been used in excess relative to the amount corresponding to the maximum fixing capacity of the support, and the amount of organometallic compound which has remained free in the liquid medium after bringing into contact is excessive, the excess organometallic compound not fixed in the support can be removed by filtering off and/or by one or more washings with the aid of a liquid hydrocarbon. However, it is possible to use a molar amount of organometallic compound which can be up to 1.5 times the amount of organometallic compound corresponding to the maximum fixing capacity of the support without it subsequently being necessary to remove the excess organometallic compound not fixed in the support.

The second step of the preparation of the solid catalyst consists in bringing the solid product resulting from the first step into contact with a monochlorinated organic compound. This compound can be an alkyl monochloride of general formula

$R_6R_7R_8CCl$ in which $R_6$ and $R_7$ are identical or different alkyl radicals comprising from 1 to 6 carbon atoms and $R_8$ is a hydrogen atom or, preferably, an alkyl radical comprising from 1 to 6 carbon atoms, which is identical to or different from $R_6$ and $R_7$. The alkyl monochloride must be chosen from the secondary alkyl monochlorides or, preferably, the tertiary alkyl monochlorides. Secondary propyl chloride or secondary butyl chloride can be used. Good catalysts are obtained with tert-butyl chloride.

The monochlorinated organic compound can also be a compound comprising at least one aryl radical, of general formula $R_9R_{10}R_{11}CCl$ in which $R_9$ is an aryl radical comprising from 6 to 10 carbon atoms and $R_{10}$ and $R_{11}$ are identical or different radicals chosen from hydrogen, alkyl radicals comprising from 1 to 6 carbon atoms and aryl radicals having from 6 to 10 carbon atoms, which are identical to or different from $R_9$. Amongst the compounds comprising at least one aryl radical, benzyl chloride or 1-phenyl-1-chloroethane is preferably used.

The chlorination of the organometallic compounds fixed in the granular support is considerably improved by the use of secondary or tertiary alkyl monochlorides or of monochlorinated organic compounds comprising at least one aryl radical.

During this step, the monochlorinated organic compound is used in a relatively small amount which nevertheless enables a solid product to be formed which is substantially free from basic groups capable of subsequently reducing a transition metal compound, such as a tetravalent titanium compound, used during the third step. The proportion of residual reducing basic groups is such that less than 10%, preferably less than 5%, of the transition metal in the intermediate solid product resulting from the third step are in the reduced state.

The amount of monochlorinated organic compound used is such that the molar ratio of the amount of monochlorinated organic compound to the amount of metal of the organometallic compound contained in the product resulting from the first step is between 1 and 3.5, preferably at least 1.5 and at most 3.0.

If there is compliance with this amount of monochlorinated organic compound to be used, not only does the product resulting from the second step contain little or no basic functional groups capable of reducing a compound of a transition metal at its maximum valency, but also at the end of this step there is no longer an excess of monochlorinated organic compound which has not reacted and remains in the free state in the liquid hydrocarbon medium. Generally, the residual amount of monochlorinated organic compound at the end of this step is negligible, and does not exceed about 1000 parts per million by weight (ppm) in the liquid hydrocarbon medium. Thus, it is therefore no longer necessary to wash the solid product resulting from the second step. Nor is it necessary to purify the liquid hydrocarbon medium after each preparation of the catalyst.

The second step of the preparation of the solid catalyst is carried out by bringing the monochlorinated organic compound into contact with the product resulting from the first step, at a temperature in the range from 0° C. to 90° C., preferably from 20° C. To 60° C. The reaction can be carried out in various ways, for example by adding the monochlorinated organic compound to the product resulting from the first step suspended in the liquid hydrocarbon medium. This addition is carried out for example, over a period of between 10 and 600 minutes, and with stirring.

The third step of the preparation of the solid catalyst consists in bringing the product resulting from the second step into contact with at least one tetravalent titanium compound. Compounds which can be chosen are, in particular, a tetravalent titanium compound of general formula $Ti(OR)_m X_{4-m}$ in which formula R is an alkyl radical comprising from 2 to 6 carbon atoms, X is a chlorine or bromine atom, m is an integer or fraction equal to or higher than 0 and less than 4. Titanium tetrachloride is preferably used.

It is possible to fix by impregnation in the granular support a relatively large amount of titanium compound, avoiding any reduction of this compound. When the titanium compound is reduced to a valency state lower than the maximum valency during the preparation of the catalyst, the latter generally has a reduced activity in the polymerization of ethylene. For this reason, the product resulting from the second step is substantially free from basic group capable of reducing the titanium compound. The product obtained under the particular chlorination conditions during the second step is particularly suitable for fixing a large capacity of titanium compounds. This enables an amount of titanium compound to be used such that the atomic ratio of the amount of titanium to the amount of metal of the organometallic compound contained in the granular support is between 0.1 and 0.9. The result of this is that the major proportion, if not all, of the amount of titanium compound used is fixed in the support with an unchanged valency state.

At the end of this step, the amount of titanium which has remained in the free state in the liquid hydrocarbon medium can be relatively small. Advantageously, it may not be necessary to wash the solid product resulting from this final step. The product can therefore be used directly as solid catalyst in ethylene polymerization.

The third step is generally carried out at a temperature in the range from 0° to 150° C., preferably from 20° to 120° C. In practice, the reaction can be carried out in various ways. For example, it is possible to add the titanium compound to the product resulting from the second step, suspended in the hydrocarbon liquid medium. This addition is carried out for example over a period of between 10 and 300 minutes, and with stirring.

The third step can be carried out in accordance with a variant which advantageously enables a solid catalyst to be produced which has a particularly high activity in the polymerization or the copolymerization of ethylene. It consists, in particular, in bringing the product resulting from the second step into contact with, firstly, at least one titanium compound rich in halogen and then with at least one titanium compound which has a low halogen content or is free from halogen. The titanium compound rich in halogen is chosen, in particular, from a tetravalent titanium compound of general formula $Ti(OR)_p X_{4-p}$ in which R and X have the definition identical to the above definitions, p is an integer or fraction equal to or greater than 0 and less than 2. Titanium tetrachloride is preferably used.

The titanium compound having a low halogen content or free from halogen is chosen in particular from a tetravalent titanium compound of general formula $Ti(OR)_r X_{4-r}$ in which R and X have a definition identical to the above definitions, r is an integer or fraction equal to or greater than 2 and less than or equal to 4. In particular, the compound which has a low halogen content or is free from halogen is a titanium tetraalkoxide. It is preferably chosen from titanium tetraisopropoxide, titanium tetra-n-propoxide, titanium tetrabutoxide, and titanium tetraethoxide.

The proportion of titanium compounds which have a low halogen content or are free from halogen relative to those rich in halogen, used during this step, can be such that the molar ratio between the former and the latter is between 0.1 and 3, preferably between 0.2 and 2.

The conditions under which the two successive operations of bringing into contact are carried out correspond to those defined above for the use of a single titanium compound. In particular, the total amount of titanium compounds is such that the atomic ratio of the total amount of titanium to the amount of metal of the organometallic compound contained in the granular support is between 0.1 and 0.9, preferably between 0.2 and 0.7.

The solid catalyst resulting from this third step comprises a support based on refractory oxide in which halogenated magnesium, tetravalent titanium compounds are fixed. The atomic ratio between the amount of magnesium and the amount of titanium in the solid product can be generally from 2 to 8, preferably from 2.5 to 5.

An electron donor compound such as a Lewis base can be employed during any one of the steps of the preparation of the catalyst, but it is not essential. The quantity of electron donor compound added, if it is used in the preparation of the catalyst may be limited to a very small proportion.

The cocatalyst is an organometallic compound of a metal of groups I to III of the periodic classification of the elements. It is generally chosen from organoaluminium compounds, such as trialkylaluminium, alkylaluminium hydrides, chlorides or alcoholates or organozinc compounds such as diethylzinc.

Within the ethylene polymerization process of the invention, the titanium based catalyst is advantageously used in the form of a prepolymer in particular when the process is a gas phase polymerization process. This prepolymer is prepared by bringing the catalyst into contact with ethylene, optionally mixed with one or more alpha-olefins. This bringing into contact can be effected by known techniques, in particular in suspension in a liquid hydrocarbon, in one or more steps. It is generally carried out with stirring, at a temperature of between 10° and 100° C., preferably between 40° and 90° C. and under a pressure generally higher than atmospheric pressure and lower than 2 MPa. The duration of this bringing into contact can be between 10 and 900 minutes and is such that the prepolymer obtained is in the form of a solid containing from 10 to 200 g, preferably from 20 to 100 g, of polymer per millimole of titanium. The prepolymer is prepared in the presence of cocatalyst and, optionally, in the presence of hydrogen.

Using the process of the invention various polymers of ethylene such as homopolyethylenes or copolymers of ethylene with at least one alpha-olefin having for example from 3 to 8 carbon atoms can be prepared.

The ethylene polymerization process can be a slurry or a solution process.

The ethylene polymerization process can be advantageously a gas phase polymerization process performed in a gas phase polymerization reactor containing a gaseous reaction mixture. This gaseous reaction mixture comprises ethylene and in most cases hydrogen. Moreover, it can comprise but-1-ene, hexene, or another alpha-olefin. Hydrogen is generally used in an amount such that the ratio of the partial pressures between hydrogen and ethylene in the gaseous mixture is in the range of 0 to 2. For producing high melt index polymers this ratio is in most of the cases between 1 and 1.5. The gaseous reaction mixture can comprise, in addition to the ethylene to be polymerized an inert gas,and in particular nitrogen.

The total pressure of the gaseous reaction mixture is generally higher than atmospheric pressure, and in order to increase the rate of polymerization, it can range from 0.5 to 5 MPa and preferably from 1 to 3 MPa. The temperature in the polymerization reactor is held at a value appropriate for the desired rate of polymerization, without, however, being too close to the softening temperature of the polymer produced. The temperature is preferably in the range between 30° and 115° C. and more preferably from 50° to 110° C.

The gas phase polymerization reactor can be chosen from apparatus of types such as fluidized bed reactors, stirred bed reactors, stirred by a mechanical stirrer, or by apparatus comprising a fluidized and stirred bed. Fluidized bed reactors are usually used by passing through a rising stream of reaction gas at a rate of generally between 20 and 100 cm per second.

According to one particular embodiment of the invention the ethylene polymerization can be the one stage of a multistage ethylene polymerization process performed in several reactors. This stage can be advantageously a stage wherein relatively high quantity of hydrogen is used.

BRIEF DESCRIPTION OF THE DRAWING

The FIGURE is a schematic diagram of an ethylene polymerization apparatus practicing the process of the present invention.

DETAILED DESCRIPTION OF THE PREFERRED EMBODIMENTS

The FIGURE shows diagrammatically an apparatus which comprises two fluidized bed reactors, connected to each other by a special device used in example 1. The apparatus comprises a first fluidized-bed reactor (1), comprising at (2) the ethylene polymer to be formed. The alpha-olefin or alpha-olefins to be polymerized are introduced into the reactor (1) by pipeline (3) and (4); a gas such as hydrogen and/or inert gas such as nitrogen may be introduced via line (5). The reactor (1) is fed with catalyst or catalyst system by means of the pipe (6) and optionally with cocatalyst by means of the pipe (7). The gaseous reaction mixture leaving the reactor (1) via the pipe (8) is cooled in heat exchanger (9) before being compressed in the compressor (10) and recycled into the reactor (1) via the pipe (4). A part of the polymer present in the reactor (1) leaves this reactor accompanied by gaseous reaction mixture, via the pipe (11); this pipe (11) provided with a valve (12) is connected to a discharge vessel (13). The polymer powder isolated in the discharge vessel (13) is transferred via the outlet valve (14) and a pipe (15) into a decompression chamber (16). A part of the gaseous reaction mixture decompressed in decompression chamber (16) may be recycled by means of a pipe (17) and a compressor (18) in the pipe (8) of the reactor (1). The polymer powder is then transferred via a full-bore valve (19) in the compression chamber (20) equipped with valves (21) and (22) which are closed and the valve (23) which is opened. The valve (19) is then closed. The polymer powder collected in the compression chamber (20) is placed under pressure by means of the gaseous reaction mixture coming from the second polymerization reactor via the pipe (24) and (25), by opening the valve (22), the valve (23) being closed. The polymer powder thus placed under pressure is then conveyed pneumatically, after the opening of the valve (21) via the transfer line (26) into the fluidized-bed reactor (27) containing at (28) the polymer powder; the pipe (26) is fed by a gas stream consisting of the reaction mixture coming the second polymerization reactor (27) via the pipe (24). A pipe (38) making it possible to introduce an activating agent leads into the transition line (26). After pneumatic conveyance of the polymer as far as the reactor (27), the valves (21) and (22) are closed and the compression chamber (20) is degassed by opening the valve (23); the gas leaving the compression chamber (20) may be recycled into the second polymerization reactor (27) via the pipe (29) and the compressor (30). The reactor (27) contains at (28) the polymer powder being formed which is maintained in the fluidized state by means of a gas stream introduced into the reactor (27) via the pipe (31). The alpha-olefin or alpha-olefins to be polymerized are introduced into the pipe (31) via the pipe (32); a gas such as hydrogen and/or an an inert gas such as nitrogen may be introduced via the pipe (33). The gaseous reaction mixture leaving the reactor (27) via the pipe (34) is cooled in a heat exchanger (35), before being compressed in the compressor (36) and recycled to the reactor (27) via the pipe (31). The polymer powder present in the reactor (27) leaves the latter via the pipe (37) which is connected to the outside by means of a withdrawal device (not shown). All the operations of the withdrawal, decompression, compression, transfer and introduction of the polymer into the reactor (27) are performed periodically, which makes it possible to provide regular operation of the installation.

Each fluidized bed reactor essentially comprises a vertical cylinder surmounted by a tranquilizing chamber and is provided in its lower part with a fluidization grid.

This apparatus comprises a metering device (39), communicating alternatively with the decompression chamber (16) and the compression chamber (20); this metering device (39) comprises a cavity making it possible to withdraw a given quantity of polymer powder from the decompression chamber (16) and deliver it to the compression chamber (20) via a full-bore valve (19).

The following example illustrate the present invention.

EXAMPLE 1

Preparation of a catalyst

A granular support consisting of a silica powder sold by GRACE (United States) under the trade designation "SG 332" having a specific surface area (BET) of 300 m$^2$/g and a pore volume of 1.7 ml/g was used. It comprised particles having a weight-average diameter of 80 microns. It was dried for 8 hours at 200° C. and a silica powder was obtained which was free from water and contained about 2 millimoles of hydroxyl group per gram. All of the operations were carried out under an inert nitrogen atmosphere.

600 ml of n-hexane, 60 g of dried silica were placed in a 1 liter stainless steel reactor fitted with a stirring device rotating at 250 revolutions per minute. Then in the course of 1 hour, 180 millimoles of dibutylmagnesium, at a temperature of 20° C., were introduced into the reactor. The solid present in the reactor was then washed 5 times with 400 ml of n-hexane and a solid containing about 2.5 millimoles of magnesium per gram of silica was obtained.

The reactor was then heated to 50° C. and 300 millimoles of tert-butyl chloride were introduced in the course of 1 hour, with stirring. At the end of this time, stirring of the mixture was continued for 1 hour at 50° C. and the mixture was then cooled to ambient temperature (20° C.). A solid product (R) which contained chlorine and magnesium in a Cl/Mg molar ratio of 1.7 and which did not contain any groups having a reducing effect on titanium tetrachloride was obtained as a suspension in n-hexane. The liquid phase of this suspension contained 500 ppm of tert-butyl chloride.

The reactor containing the suspension of the solid product (R) in n-hexane was then heated to 50° C. 60 millimoles of titanium tetrachloride were introduced, with stirring, in the course of 1 hour. The mixture thus obtained was stirred for a further 2 hours at 70° C. and was then washed 3 times with 600 ml of n-hexane. 6 millimoles of dimethylformamide were added and the mixture was stirred for 1 hour at 50° C. and then cooled to ambient temperature. A solid (S) suspended in n-hexane was thus obtained which contained 2.5 millimoles of magnesium and 0.78 millimole of tetravalent titanium per gram of silica.

2 liters of n-hexane, 9.6 millimoles of tri-n-octylaluminium and an amount of the solid product (S) containing 6 millimoles of titanium were introduced into a 5 liter stainless steel reactor provided with a stirring device rotating at 750 revolutions per minute and heated to 70° C. A volume of 280 ml of hydrogen, measured under normal conditions, was then introduced into the reactor and ethylene was then introduced at a regular flow rate of 60 g/h for 4 hours. At the end of this time, the reactor was degassed and its contents were transferred to a rotary evaporator where the n-hexane was evaporated at 60° C. under a partial vacuum. The ready-to-use solid catalyst (T) was thus obtained in the form of a powder consisting of particles having a weight-average diameter of 250 microns and containing 40 g of polyethylene per millimole of titanium.

Production of an ethylene polymer having a relative density of 0.952

The process was carried out in an apparatus comprising two different fluidized bed reactors connected to one another by means of a transfer device constructed in accordance with the figure.

The first reactor comprised a cylindrical part, having a vertical axis, 45 cm in diameter and 7.2 m high. The second reactor comprised a cylindrical part, having a vertical axis, 90 cm in diameter and 6 m high.

The first reactor contained a fluidized bed, having a height of 1.9 m, of particles of ethylene polymer in formation and an ascending stream of a first gaseous reaction mixture rising at a rate of 50 cm/s and having a total pressure of 1.70 MPa and a temperature, measured at the outlet of the tranquilizing chamber, of 95° C. passed through this fluidized bed.

The first gaseous reaction mixture comprised, by volume, 35% of ethylene, 0.3% of but-1-ene, 42% of hydrogen, 1% of ethane and 21.7% of nitrogen. As a result, the ratio of the partial pressures of hydrogen to ethylene was 1.2 and the ratio of the partial pressures of but-2-ene to ethylene was close to 0.01. The reactor was fed, with the aid of the prepolymer feed pipe, with a prepolymerized catalyst prepared as above, at a flow rate of 350 g/hour. In addition, it was fed with a solution of chloroform in n-hexane, at a chloroform flow rate of 260 mg/h.

The polymer forming in this first reactor was produced at a rate of 25 kg/hour and at a relative density of 0.964, a but-1-ene content of less than 0.5% by weight, a titanium content of 17 ppm and a melt index, measured at 190° C. under a charge of 2.16 kg, of 150 g/10 minutes.

This polymer was withdrawn from the first reactor at a flow rate of 25 kg/hour and was introduced at the same flow rate into the second reactor by means of the transfer device. The introduction of polymer into the second reactor was effected by means of the polymer feed line.

In the polymer withdrawn from the first reactor, the fine polymer particles having a diameter of less than 125 microns represented less than 1% of all of the particles making up this polymer.

The second reactor contained a fluidized bed, having a height of 1.5 m, of particles of ethylene polymer in formation, and an ascending stream of a second gaseous reaction mixture rising at a rate of 35 cm/s and having a total pressure of 1.7 MPa and a temperature, measured at the outlet of the tranquilizing chamber, of 70° C. passed through this fluidized bed. This second reaction mixture comprises, by volume, 44% of ethylene, 0.8% of 4-methylpent-1-ene, 1.3% of hydrogen and 53.9% of nitrogen. As a result, the ratio of the partial pressures of hydrogen to ethylene was 0.03 and the ratio of the partial pressures of 4-methylpent-1-ene to ethylene was 0.018. The final polymer produced in the second reactor was withdrawn at a flow rate of 50 kg/hour and had a relative density of 0.952, a but-1-ene content of less than 0.25% by weight, a 4-methylpent-1-ene content of 0.7% by weight, a titanium content of 9 ppm, a melt index, measured at 190° C. under a charge of 21.6 kg, of 8 g/10 minutes and a molecular weight distribution, measured by the ratio between the weight-average molecular weight Mw and the number-average molecular weight Mn, of 20.

EXAMPLE 2

150 g of a homopolyethylene originating from a previous polymerization were introduced as a powder charge in a 2.5-liter stainless reactor equipped with a stirring system for dry powder, rotating at 250 revolutions per minute and kept under nitrogen atmosphere, followed by a quantity of a prepolymer prepared in example 1 and containing 0.65 millimole of titanium. The reactor is heated to 90° C. and hydrogen and ethylene were introduced into it so as to obtain a ratio of the partial pressure of hydrogen to the partial pressure of ethylene of 1.25 and a partial pressure of ethylene of 0.4 MPa. Ethylene was introduced into the reactor during the reaction so as to maintain constant the partial pressure of ethylene. After 3 hours' reaction 590 g of polyethylene were produced, and the ethane formation was 7 g of ethane per kg of produced polyethylene. The average activity of the catalyst was equal to 76 g of polyethylene per 0.1 MPa of ethylene, per hour of reaction, and per millimole of titanium in the catalyst.

EXAMPLE 3

The operation was carried out exactly as in example 2 except for the fact that 0.6 millimole of chloroform was introduced into the reactor at the beginning of the reaction. After 2.42 hours' reaction 500 g of polyethylene were produced, and the ethane formation was 3.5 g of ethane per kg of produced polyethylene. The average activity of the catalyst was of 80 g of polyethylene per 0.1 MPa of ethylene, per hour of reaction, and per millimole of titanium in the catalyst.

EXAMPLE 4

The operation was carried out exactly as in example 2 except for the fact that 1 millimole of trichloro-1,1,1 ethane were introduced into the reactor at the beginning of the reaction. After 2.40 hours reaction 500 g of polyethylene were produced, and the ethane formation was 5.3 g of ethane per kg of produced polyethylene. The average activity of the catalyst was equal to 80 g of polyethylene per 0.1 MPa of ethylene, per hour of reaction, and per millimole of titanium in the catalyst.

I claim:

1. An ethylene polymerization process carried out with a Ziegler-Natta catalyst composition consisting essentially of titanium, halogen and magnesium, which process comprises introducing a polychlorinated saturated hydrocarbon into the polymerization mixture containing ethylene and said Ziegler-Natta catalyst composition in a quantity such that the molar ratio of polychlorinated saturated hydrocarbon compound to the titanium of the catalyst composition is in the range from about 0.01 to 1.8.

2. The process according to claim 1 characterized in that the halogenated hydrocarbon compound is chloroform or trichloro-1,1,1-ethane.

3. The process according to claim 1 or 2 characterized in that the halogenated hydrocarbon compound is used in a quantity such that the molar ratio of halogenated hydrocarbon compound to the titanium of the catalyst composition is in the range from about 0.05 to 0.5.

4. The process according to claim 1 or 2 characterized in that the ethylene polymerization is a gas phase polymerization process.

5. The process according to claim 1 or 2 characterized in that the ethylene polymerization is performed in the presence of hydrogen.

6. The process according to claim 5 characterized in that the ethylene polymerization is performed in the presence of a quantity of hydrogen such that the molar ratio between hydrogen and ethylene is higher than about 0.5.

7. The process according to claim 1, wherein the formation of ethane is reduced.

8. The process according to claim 1 or 2 characterized in that the titanium containing catalyst composition is supported on a granular inorganic support.

9. The process according to claim 8 characterized in that the titanium containing catalyst composition is prepared by a process comprising:

a) in a first step, bringing a granular support comprised of a refractory oxide, having hydroxyl groups, into contact with an organometallic compound comprising a dialkylmagnesium or a dialkylmagnesium and a trialkylaluminium, b) in a second step, bringing the product resulting from the first step into contact with a monochlorinated organic compound of general formula $R_6R_7R_8CCl$ or of the general formula $R_9R_{10}R_{11}CCl$, in which $R_6$ and $R_7$ are identical or different alkyl radicals comprising from 1 to 6 carbon atoms, $R_8$ is a hydrogen atom or an alkyl radical comprising from 1 to 6 carbon atoms which is identical to or different from $R_6$ and $R_7$, $R_9$ is an aryl radical comprising from 6 to 10 carbon atoms and $R_{10}$ and $R_{11}$ are identical or different radicals chosen from hydrogen, alkyl radicals comprising from 1 to 6 carbon atoms and aryl radicals having from 6 to 10 carbon atoms, which are identical to or different from $R_9$, and c) in a third step, bringing the product resulting from the second step into contact with at least one tetravalent titanium compound.

10. A multistage ethylene polymerization process characterized in that one stage of the polymerization is performed according to the process according to claim 1 or 2.

11. The process according to claim 5, characterized in that hydrogen is used in a quantity such that the molar ratio of hydrogen to ethylene is from about 1 to 1.5.

* * * * *

UNITED STATES PATENT AND TRADEMARK OFFICE
CERTIFICATE OF CORRECTION

PATENT NO. : 5,863,995

DATED : January 26, 1999

INVENTOR(S) : ERICK DAIRE

It is certified that error appears in the above-identified patent and that said Letters Patent is hereby corrected as shown below:

Abstract, last line, "trichloro-1,1-ethane" should read --trichloro-1,1,1-ethane--.

Column 1, line 37, "present" should read "presence--.

Column 10, line 10, "but-2-ene" should read -but-1-ene--.

Signed and Sealed this

Twenty-fifth Day of May, 1999

Attest:

Attesting Officer

Q. TODD DICKINSON

Acting Commissioner of Patents and Trademarks